US007685508B2

(12) United States Patent
Froyd et al.

(10) Patent No.: US 7,685,508 B2
(45) Date of Patent: Mar. 23, 2010

(54) DEVICE MONITORING VIA GENERALIZED MARKUP LANGUAGE

(75) Inventors: Stanley G. Froyd, Carpinteria, CA (US); Will Sloan, Coleta, CA (US)

(73) Assignee: Occam Networks, Santa Barbara, CA (US)

( * ) Notice: Subject to any disclaimer, the term of this patent is extended or adjusted under 35 U.S.C. 154(b) by 974 days.

(21) Appl. No.: 10/060,581

(22) Filed: Jan. 29, 2002

(65) Prior Publication Data

US 2003/0110447 A1 Jun. 12, 2003

Related U.S. Application Data

(63) Continuation-in-part of application No. 09/858,443, filed on May 15, 2001.

(51) Int. Cl.
*G06F 17/00* (2006.01)

(52) U.S. Cl. ....................... 715/222; 715/224; 715/239; 709/224; 709/220

(58) Field of Classification Search ................. 715/506, 715/507, 505, 526, 517, 512, 222, 224, 237; 709/224, 220
See application file for complete search history.

(56) References Cited

U.S. PATENT DOCUMENTS

| | | | | |
|---|---|---|---|---|
| 5,491,796 | A | 2/1996 | Wanderer et al. | |
| 5,530,852 | A | 6/1996 | Meske, Jr. et al. | |
| 5,861,883 | A | 1/1999 | Cuomo et al. | |
| 5,911,776 | A | 6/1999 | Guck | |
| 6,085,275 | A | 7/2000 | Gallup et al. | |
| 6,202,072 | B1 | 3/2001 | Kuwahara | |
| 6,278,994 | B1 | 8/2001 | Fuh et al. | |
| 6,460,042 | B1 * | 10/2002 | Hitchcock et al. | 707/10 |
| 6,539,422 | B1 * | 3/2003 | Hunt et al. | 709/217 |
| 6,725,233 | B2 | 4/2004 | Froyd et al. | |
| 6,978,301 | B2 | 12/2005 | Tindal | |
| 7,054,946 | B2 | 5/2006 | Tindal et al. | |
| 7,139,834 | B1 | 11/2006 | Albanese et al. | |
| 7,155,496 | B2 | 12/2006 | Froyd et al. | |

(Continued)

FOREIGN PATENT DOCUMENTS

WO WO 02/093429 A1 11/2002

(Continued)

OTHER PUBLICATIONS

International Search Report for PCT/US03/02528, mailed May 5, 2003 (5 pages).

(Continued)

*Primary Examiner*—Stephen S Hong
*Assistant Examiner*—Matthew J Ludwig
(74) *Attorney, Agent, or Firm*—Blakely, Sokoloff, Taylor & Zafman LLP

(57) ABSTRACT

A request to view statistic data of a system is received. One or more forms are generated to carry the statistic data. The one or more forms are to carry the statistic data pulled from the system. Based on data fields on the one or more forms, the requested statistic data is pulled from the system. The one or more forms are filled with the pulled requested statistic data. The pulled requested statistic data on the one or more forms is converted to a generalized markup language (GML) format.

30 Claims, 15 Drawing Sheets

U.S. PATENT DOCUMENTS

| | | | | |
|---|---|---|---|---|
| 7,249,170 | B2 | 7/2007 | Tindal et al. | |
| 2002/0032790 | A1 | 3/2002 | Linderman | |
| 2002/0069271 | A1 | 6/2002 | Tindal et al. | |
| 2002/0069275 | A1 * | 6/2002 | Tindal | 709/223 |
| 2002/0069340 | A1 | 6/2002 | Tindal et al. | |
| 2002/0069367 | A1 | 6/2002 | Tindal et al. | |
| 2002/0124061 | A1 | 9/2002 | Mossman | |
| 2002/0174091 | A1 | 11/2002 | Froyd et al. | |
| 2002/0198974 | A1 | 12/2002 | Shafer et al. | |
| 2003/0005273 | A1 | 1/2003 | Perycz et al. | |
| 2003/0018755 | A1 | 1/2003 | Masterson et al. | |
| 2003/0115299 | A1 | 6/2003 | Froyd et al. | |
| 2006/0167985 | A1 * | 7/2006 | Albanese et al. | 709/203 |

FOREIGN PATENT DOCUMENTS

| | | |
|---|---|---|
| WO | WO03065238 | 8/2003 |

OTHER PUBLICATIONS

International Search Report for PCT/US03/02808, mailed Apr. 1, 2003 (1 pg).

International Search Report for PCT/US03/02528, mailed May 5, 2003 (1 pg).

International Search Report for PCT/US02/14532, mailed Aug. 7, 2002 (2 pgs).

* cited by examiner

| | Tag | Attributes | Text | Description |
|---|---|---|---|---|
| 405 | <cli> | - | - | Contains zero or more modes |
| 410 | <mode> | name | - | Contains zero or more command tags. Attribute is required. |
| 415 | <command> | - | - | Contains a required keyword tags. |
| 420 | <keyword> | text | - | Contains zero or more keyword tags, with an optional action or help tag. Attribute is required. |
| 425 | <help> | - | Yes | May be embedded in keyword or arg elements. |
| 430 | <action> | object<br>method | - | Contains zero or more arg tags. The attributes are required. |
| 435 | <arg> | - | - | Contains a single instance of type tag, may contain a help tag. |
| 440 | <type> | Type | - | Empty tag. Attribute is required, must be a valid java type. |

Fig. 4

```
505  Command  > clock set ?
      hh : mm : ss Current Time

510  Command  > clock set 00:00:00?
     <1 - 31 >  Day of the month
     MONTH  Month of the year

515  Command > clock set 00:00:00 25 Sep?
     <1993 - 2035> Year

520  Command > clock set 00:00:00 25 Sep 2000
     Command  >
```

525

```
<command>
    <keyword text="clock">  527
        <help>Manage the System clock</help>
        <keyword text="set">  528
            <help> Set the time and date</help>
            <action object="Clock" method="set">  529
                <arg> <!=time argument -->
                    <type type="java,land. String"></type>
                    <help .hh:mm:ss Current Time </help>  530
                </arg>
                <arg> <!-day of the month argument -->
                    <type type="java, lang. Integer"></type>
                <help>&1t ;1-31> Day of the month  </help  535
                </arg>
                <arg>  <!-day of the month argument -->
                    <type type="java. lang. Integer"></type>
                    <help>MONTH Month of the year </help>  540
                </arg>
                <arg> <!-year argument -->
                    <type type="java, lang. Integer" ></type>
                    <help>&1t;1993-2035> ear</help>  545
                </arg>
            </action>
        </keyword>
    </keyword>
</command>
```

```
Command>  show clock
   * 04:10 ;12.621 UTC Thu May 6 1993
```

710

```
Command> show clock detail
   *04:10:18.109 UTC Thu May 6 1993
   Time source is user configuration
```

715

```
</xml version="1.0" encoding="US-ASCII"?>
<!DOCTYPE cli SYSTEM "cli.dtd">
<cli>
<mode name="global">
 ....
<command>
    <keyword text="show">
    <help>Show running system information</help>
   .... <!-lots of other show keyword... -->

          <keyword text="clock">
              <?help>display the system clock</help>
              <action object="Clock" method="show">
              </action>

              <keyword text="detail">
                    <help>Display detailed information </help>
                   <action object="Clock" method="showDetail">
                   </action>
              </keyword>
        </keyword>
    </keyword>
</command>
</mode>
</cli>
```

DEVICE MONITORING VIA GENERALIZED MARKUP LANGUAGE

This is a continuation in part (CIP) application to a related application having Ser. No. 09/858,443 filed on May 15, 2001.

FIELD OF THE INVENTION

The present invention relates generally to field of system monitoring. More specifically, the present invention is directed to methods and systems for monitoring using generalized markup language.

BACKGROUND

Embedded systems are growing more and more complex, requiring a range of external management applications such as SNMP, Command Line Interfaces, TNM, WBEM, etc. These applications have completely different interfaces, network protocols and purposes but must all interface to the low-level internals of the system.

In order for a system to perform successfully in a user environment, it is necessary that the user be able to configure the system to operate as desired, and to be able to observe the system for troubleshooting and monitoring purposes. Further, the system needs to be able to provide its configuration at any moment and needs to be able to be restored to captured configuration. The configuration may possibly be edited offline. This functionality is collectively known as "management".

Management may be effected through a variety of user interfaces. The most common is Command Line Interface (CLI), where configuration and display commands are entered in text mode and promptly executed. Another common interface is Simple Network Management Protocol (SNMP) where configuration and monitoring data is transmitted over the network.

The configuration data may be associated with settings and information about the system. For example, a user may use a system console to enter system specific commands to configure components in the system (e.g., setting a speed of a line card in a switch, etc.). As time passes, there may be multiple configuration commands issued by the user. When a system is powered off, this configuration information may be lost.

The monitoring data may indicate how often something happens in the system. For example, a network router system may handle multiple different types of traffic, and it is important to be able to get an understanding of how much traffic the system is handling and whether upgrades are necessary before the system is overloaded. Another example includes determining how often errors occur in an area of the system and whether corrective action needs to be taken before a failure occurs. Statistic data is typically never reset. Statistic data either stays the same or grows. Although there may be different types of statistic data, the type of statistic data collected typically relate to performance statistic and error statistic. Thus, one of the advantages of being able to configure the system and to collect the statistic data are important in maintaining the system as well as in predicting when upgrades or replacement is necessary.

SUMMARY OF THE INVENTION

In one aspect of the invention, a method of monitoring a system is disclosed. A request to view statistic data of a system is received. One or more forms are generated to carry the statistic data. The one or more forms are to carry the statistic data pulled from the system. Based on data fields on the one or more forms, the requested statistic data is pulled from the system. The one or more forms are filled with the pulled requested statistic data. The pulled requested statistic data on the one or more forms is converted to a generalized markup language (GML) format.

Other features of the present invention will be apparent from the accompanying drawings and from the detailed description which follows.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

FIG. 4 is a table illustrating exemplary XML (Extensible Markup Language) tags.

FIG. 5 is an exemplary illustration of a push operation and an XML file mapping the push operation.

FIG. 7 is an exemplary illustration of a pull operation and an XML file mapping the pull operation.

DETAILED DESCRIPTION

Figure 1A:
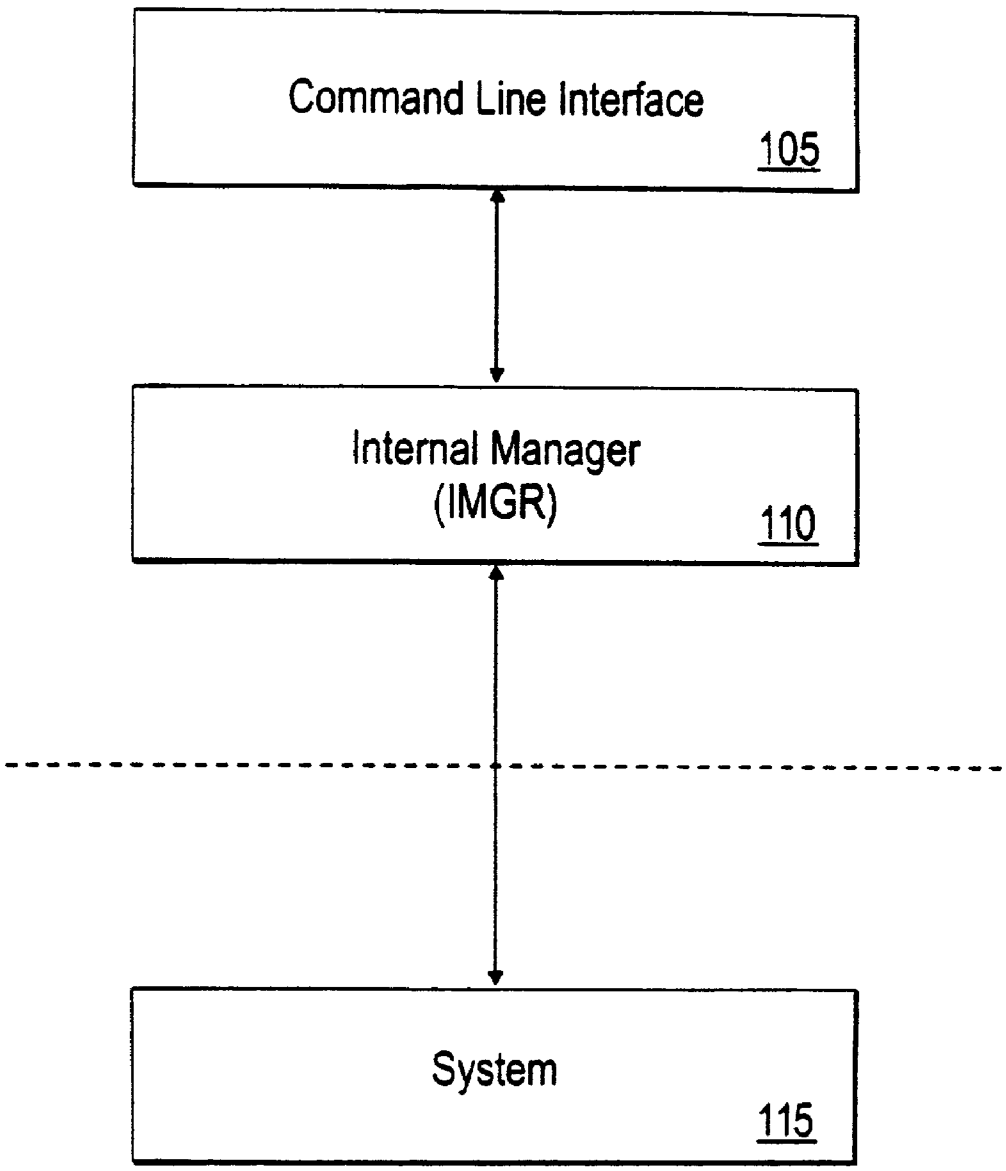
FIGS. 1A and 1B provide exemplary illustrations of an Interface Manager.

In one embodiment of the present invention, a method of accessing statistic information in a system is disclosed. Using a framework consisting of different delivery vehicles or forms to carry statistic information from the system, the method generates appropriate forms based on a request to access selected statistic information. The requested statistic information is pulled from the system and filled into the one or more forms to be delivered. The requested statistic information on the one or more forms is converted into a generalized markup language format and then viewed in a network browser. The requested statistic information may also be stored in a storage device, or it may be presented using a command line interface (CLI).

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Generally, a system is managed by using high-level applications that collect data from or send data to the system. The system may also be managed by issuing commands using a command line interface (CLI).

In one embodiment of the present invention, a framework is provided for system management that is abstracted from the low-level elements of the system to be managed and the high-level applications that manage them. Collectively, this framework is called the Internal Manager or IMGR of the system.

The IMGR performs as an abstraction layer between system implementation and system management applications independently of both applications. The IMGR provides a generic interface for saving and restoring system state. The IMGR also provides a generic interface that allows for the retrieval of data (e.g., scalar and tabular data) from the system. For example, the IMGR provides an interface definition that allows implementers of device drivers and low-level system services to provide configurable attributes (e.g., configuration information) and statistic (e.g., monitoring information) to the higher-level system management applications without knowing anything about the system management applications. The IMGR also allows system management application developers (e.g., CLI, SNMP, etc.) to work autonomously, promoting code reuse and information hiding as well as programmer productivity. In addition, the IMGR provides a uniform interface across the system that can handle the complicated task of saving and restoring system state.

The IMGR is a system wide construct that allows the low-level developers of a system to provide access to data (e.g., parameter data, statistic data, etc.) of the system without having any knowledge of the applications that will use this data. It is a system wide abstraction layer, below which are kernel device drivers and various system services software and above which are the applications that provide management services. Using this framework, applications can be insulated from the system implementation and vice versa.

Figure 1B:
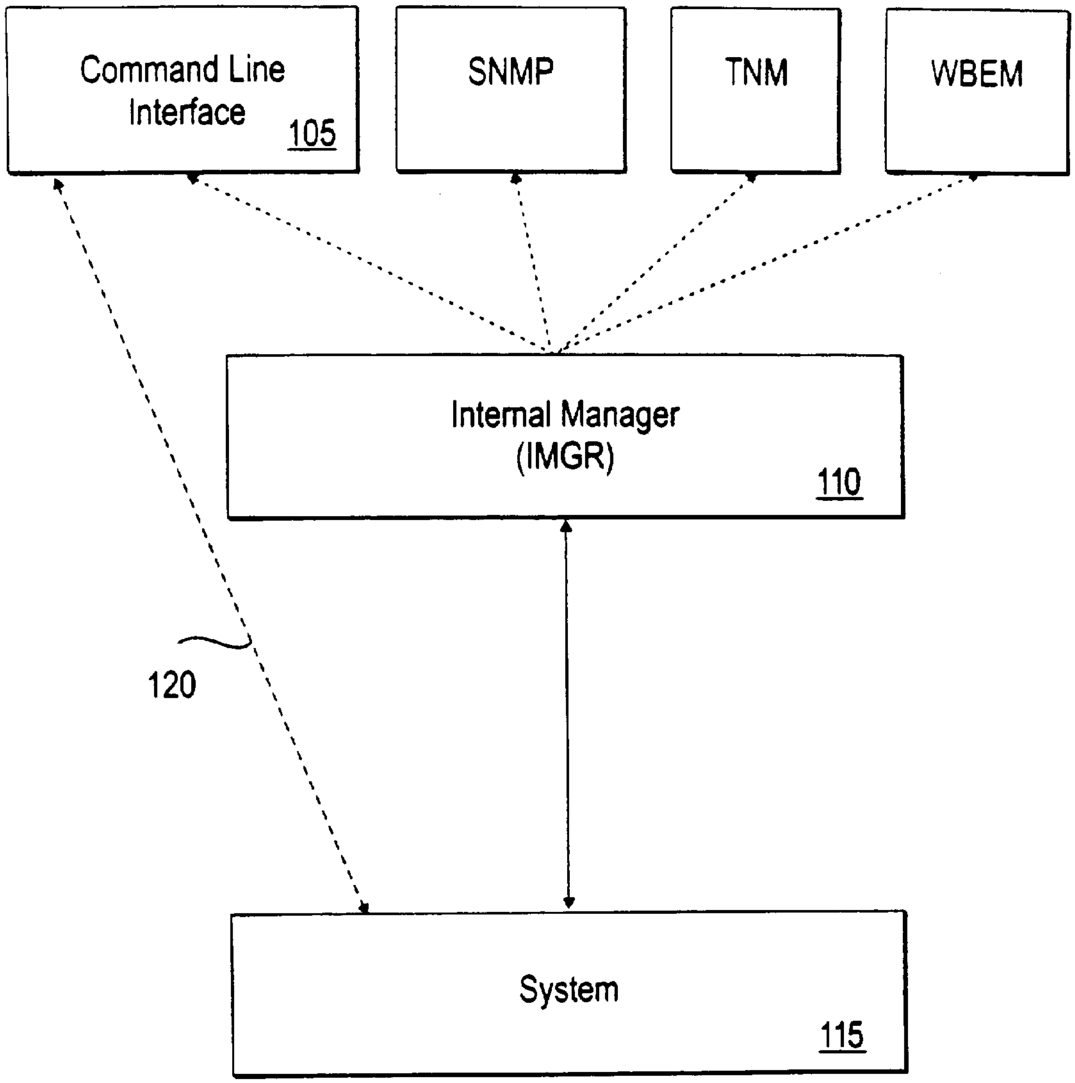

FIGS. 1A and 1B provide exemplary illustrations of an Interface Manager. Referring to FIG. 1A, the system 115 includes hardware components, operating software, device drivers, etc. As described herein, a range of different management applications is used to control and manage the system 115.

In one embodiment, the IMGR 110 is created between the command line interface (CLI) 105 and the low-level elements (e.g., kernel device drivers and various system services software, etc) of the system 115. The IMGR 110 lies between the user management (CLI, SNMP, etc.) and the operating software and serves as an intermediary abstraction layer. The IMGR 110 operates to provide translations of functions of the low-level elements in the system 115 to the CLI 105. Although the CLI 105 is used in this discussion, it would be apparent to one skilled in the art that the description may also be applicable to other management applications (e.g., SNMP application, etc.) at the same layer as the CLI 105, as illustrated in FIG. 1B.

The IMGR 110 defines an abstract interface and a framework gluing internal applications (at the CLI 105 ) to the system 115 they are to manage. In one embodiment, it is assumed that only data is conveyed between the IMGR 110 and the operating software in the system 105.

The IMGR 110 provides a representation of system data based on an extensible interface that uses a notion of forms with special operations. These forms can be "pulled" from the system to retrieve attributes such as system settings (e.g., configuration information) and statistic (e.g., monitoring information) or pushed into the system to handle configuration (e.g., restoring configuration). The IMGR 110 is based on object-oriented concepts requiring a programmer to implement specific interfaces. These interfaces make available certain operations to the managers such as, for example, the concept of a "GETNEXT" operation that can be used on any table of meta-data to traverse its rows and columns irrespective of the underlying data type and bounds of the table.

In one embodiment, the IMGR 110 includes a group of Java objects which are extensions of a base form object. Each form carries data. Both the application layer (e.g., CLI layer 105) and system layer 115 (with its operating software) are knowledgeable of particular editions of these forms, which are the basis of communications between these layers. In addition to carrying data, the forms may also operate on the data they carry. For example, the form may format the data for user presentation, or it may assist in traversing instances of a table.

The data from the system 115 can be statistic data or parameter data. Statistic data are data maintained by the operating software. Statistic data are thus considered to be read-only from a management point of view. For example, there is no SET type of operation for statistic data. Thus, statistic data can only be pulled from the system. For example, a number of times the clock has been read is considered a statistic data. Statistic data can also be considered as counters maintained by the operating software.

As described above, data may be parameter data or statistic data. Data that is not statistic data is considered parameter data. Individual parameter data may be read-only (RO) or read-write (RW). Thus, all parameter data can be pulled and some parameter data can be pushed. Referring to FIG. 1B, data sent from the IMGR 110 to the system 115 is parameter data and not statistic data. However, data sent from the system 115 to the IMGR 110 can be either statistic data or parameter data.

The base form object can be implemented as a data structure defined with one or more fields to carry the data to the system 115 or from the system 115. Data are grouped onto the same form based on logical relationships of the data. New forms can be added to accommodate different groupings of data. In one embodiment, there is one operating software function for pulling (populating) the form, and zero or one function for push the form. At the upper interface (e.g., CLI layer 105), however, it may take several forms to satisfy a particular CLI command.

In one embodiment, when a form is pulled (from the system), all parameter data will be filled out by the operating software in the appropriate fields. When a form is pushed (to the system), the operating software will look only for those fields in the form which have the RW (read-write) attributes. For example, a SETCLOCK operation involves pushing parameter data, while a READCLOCK operation involves pulling parameter data. If information about the number of times the clock has been read is required, a CLOCKREAD operation would pull statistic, using a separate form. Thus, parameter data is different from statistic data. Note that a form is merely a snapshot of data (or an instance) at a particular time.

When a form carrying data from the system 115 is received by the IMGR 110, the IMGR 110 presents the form to the management applications or the CLI 105. In one embodiment, the data in the form are automatically formatted for presentation to the CLI 105 or for presentation to the management applications at the CLI layer. Similarly, when the IMGR 110 presents a form to the operating software in the system 115, the data in the forms is presented according to an appropriate data structure understood by the operating software. Thus, code that places data in a form and code that extracts data from the form are knowledgeable about a layout of the form such that the data in the form can be consistently interpreted. In one embodiment, it is acceptable to have RO parameter data and RW parameter data on the same form. Note that multiple instances of the same form can be extracted with each instance possibly having different data.

There may be multiple forms to carry different types of data with each form used to carry one or more data. A form may be used to carry data in response to different actions. For example, the same form may be used to carry statistic data from the system 115 in response to different actions issued by the CLI 105 or by the management applications. Similarly, the same form may be used to carry parameter data from or to the system 115 for different actions. There may be different forms for different commands.

A form may be pulled from the system 115 to gather system attributes (e.g., system configurations, statistic, etc.). For example, a filled-out form can be pulled up from the operating software as a result of a GET/SHOW/DISPLAY command from the CLI 105. A form may be pushed to the system 115 to set system configuration. For example, parameter data associated with a command SET/CONFIGURE is pushed in a form to the operating software in the system 115. There is a one-to-one correspondence between a form and platform code that fills out or reacts to a form. Knowledge of the different forms is required for the different push and pull operations between the management applications/CLI 105 and the system 115. These forms form a basis of communication between the management applications/CLI 105 and the system 115

Figure 2:
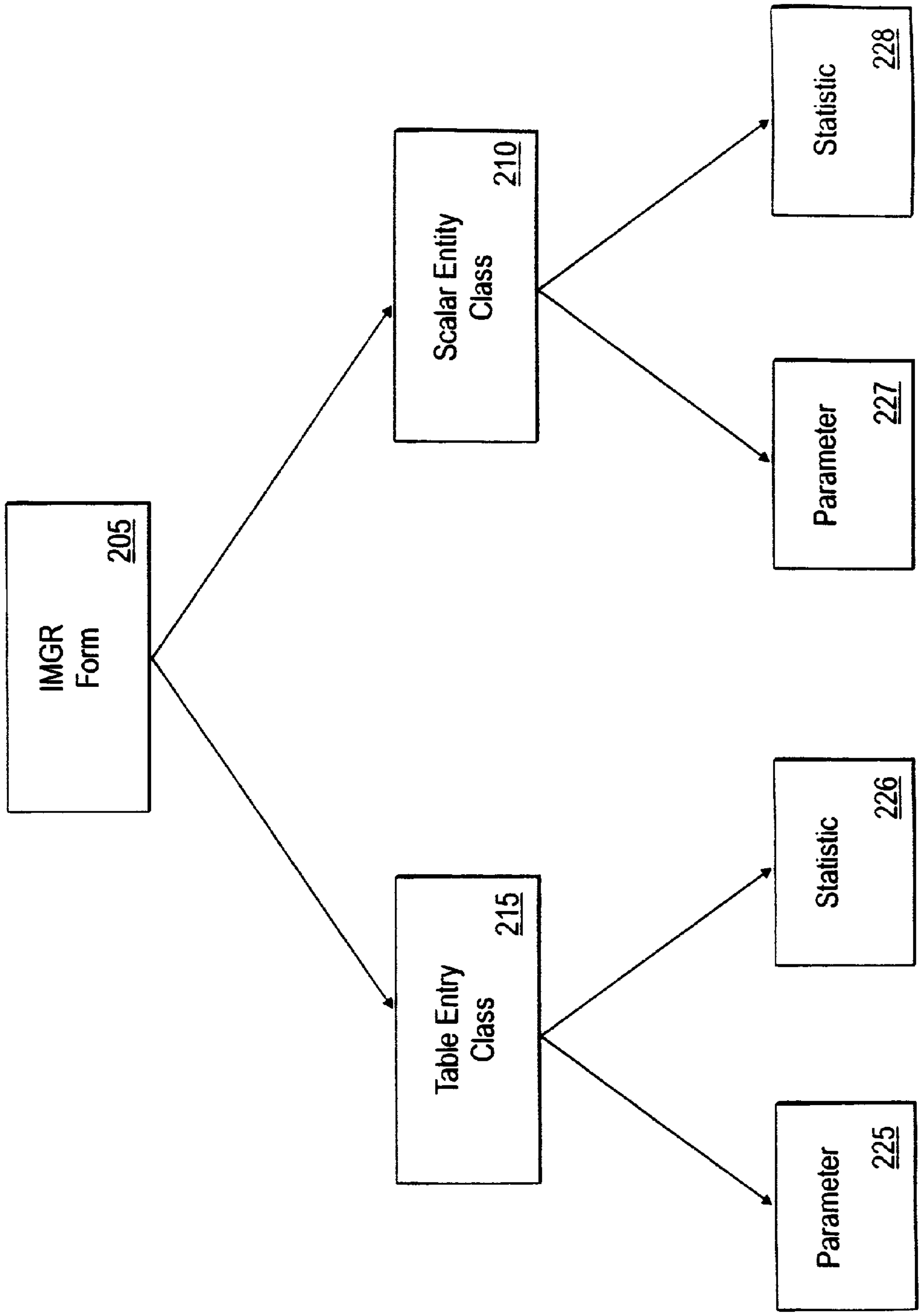
FIG. 2 is an illustration of an exemplary hierarchy of forms and form classes defined by the present invention.

FIG. 2 is an exemplary illustration of hierarchy of forms and form classes. In one embodiment, the interaction between the CLI 105 and the IMGR 110 is performed using commands in a command set. For example, the command set may include a GET NEXT command that can be used to traverse rows and columns of a table data structure. As described herein, each of the commands in the command set is associated with a form and that there may be multiple distinct forms.

Referring to FIG. 2, a form 205 may be designed to work with a single data ("scalar data") in a scalar entity class 210 or with a row of data in a table ("tabular data") in a table entry class 215. The data in the table entry class 215 may be further sub-classed as parameter data 225 or statistic data 226. Similarly, the scalar entity class 210 may be further sub-classed as parameter data 227 or statistic data 228. Thus, a form 205 may be categorized as one of the four following abstract subclasses:

InternalManager—Table—Parameter
InternalManager—Table—Statistic
InternalManager—Scalar—Parameter
InternalManager—Scalar—Statistic.

The tabular data may be accessed as an instance. For example, the form may correspond to exactly one row of the table, and rows of a table can be differentiated by some combination of columns of the table. Different instances of the same table can be used so that specific entries in the table can be located, or so that the table can be traversed. In one embodiment, a form 205 cannot be used to carry a mixed combination of scalar data and tabular data. In another embodiment, a form 205 does not support tables within tables.

In one embodiment, the command set supported by the IMGR 110 should at least have pull management commands for pulling statistic from the system 115. This allows for at least some monitoring capabilities. In another embodiment, data originally placed on one form may be presented in multiple forms. For example, data pulled from the system 115 to the IMGR 110 may be placed on one form, but the IMGR 110 may extract the data from the one form and place them onto multiple forms before they are presented to the management applications or the CLI 105. The operating software of the system 115 fills out the forms to be pulled from the system. The operating software of the system 115 also processes forms pushed down to it by the IMGR 110.

In one embodiment, it is acceptable to have both parameter data and statistic data on the same form. Thus, a form may be a parameter form, a statistic form, or a parameter and statistic form. For example, an interface index item might appear on the same form as an interface statistic data in order to correlate the interface and the associated statistic data. The interface index item may also appear on several forms carrying parameter and/or statistic data. In one embodiment, just because a data is on a parameter form, it isn't necessarily settable, though other items on the same form might be settable. In one embodiment, a speed of the interface may be settable, but not its identity. For example, it is likely that statistic data would be pulled from the system frequently and repetitively (e.g., for monitoring purpose), and as such, forms used to carry statistic data may be handled differently for optimization.

Figure 3:
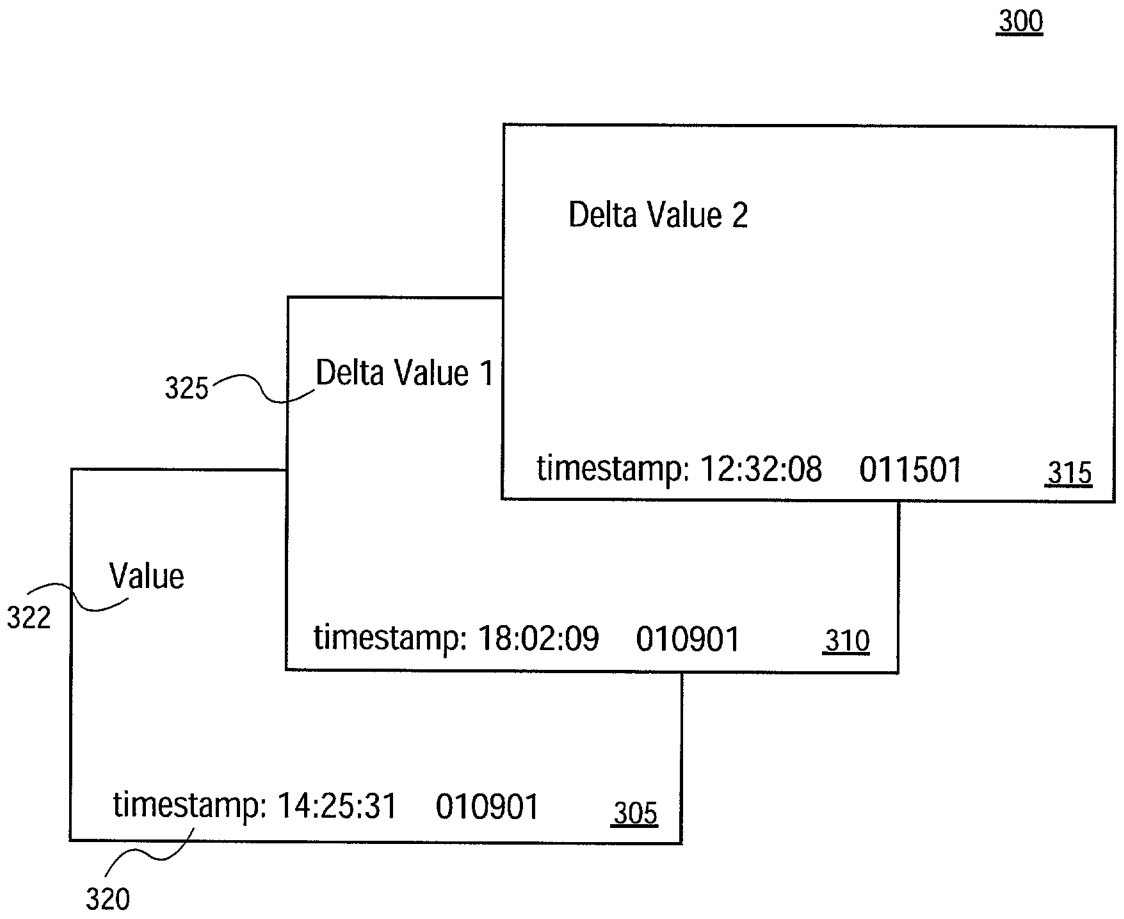
FIG. 3 is an exemplary illustration of three instances of a form.

FIG. 3 is an exemplary illustration of three instances of a form. Referring to FIG. 3, the three instances 305, 310 and 315 of the same form 300 are received at three different times. Each instance provides a snap shot of the data on the form 300 at a particular time. In one embodiment, each form is time stamped when it is used to carry the data. The timestamp may be used to determine how much time has elapsed since a previous pull operation. For example, the instance 305 of the form 300 has a time stamp field 320. In one embodiment, the instance 305 is stored so that it can be used to compare with a next instance of the same form.

In one embodiment, a delta value is pulled rather than an absolute value. For example, the instance 310 of the form 300 has a delta value 325. The delta value 325 indicates a difference from the absolute value 322 in the instance 305. In another embodiment, for each pull operation, an indicator may be set on the form to indicate to the system 115 that the fields on the form need to be updated only when the system 115 has different values than the default startup values for those fields. When a pull operation is not successful, a "fail" condition may be returned to the management applications or to the CLI 105.

Each of the fields on a form may carry non-null values or null values. In one embodiment, when there is a push operation, any fields on the form that have null values may be disregarded by the system 115. The system 115 may extract data from the fields that have non-null values. The system 115 may accept the non-null values of alphanumeric type or numeric type. The system 115 may not accept a specific numeric or alphanumeric value, however.

In another embodiment, each form may be associated with a "save" and a "restore" function. For example, when the "save" function is invoked for a particular form, data corresponding to the fields on that form are pulled from the system 115. The data then sent to a destination (e.g., user, management application, data file, etc.). When the "restore" function is invoked, the previously saved data is placed into the appropriate form. The form is then pushed down to the system 115. The data is then extracted from the form to complete the restore operation.

An instance of a form may have scalar data or it may have tabular data. As described herein, when a form is used to carry tabular data, each instance of the form carries one row of data from the table. An indicator may be sent along with the form to provide information regarding where the row is in the table. It is assumed that the table remains constant during the lifespan of the push or pull operations.

When a command associated with a pull operation (e.g., SHOW command) is issued using the CLI 105, an interpreter resolves the command into an object/method pair. The "object" is a glue that calls a static method in the form class which in turn pulls an instance of the form up from the system 115 and generates display information back to the CLI 105. The form can also be read by the method of the glue object.

When a command associated with a push operation (e.g., CONFIG command) is issued using the CLI 105, the command can also be resolved to an object/method pair. In this example, an empty instance of the form is created and the command parameters are translated into settings of the fields of the form. The form is then pushed to the operating software in the system 115 to effect the push operation.

When the IMGR 110 is used to interface with SNMP (as shown in FIG. 1B), most of the SNMP code is automatically generated by an agent software (e.g., AdventNet software from AdvenNet, Inc. of Pleasanton, Calif.) when it interprets a Management Information Base (MIB) file. In one embodiment, lowest levels of this agent code are edited to effect the "instrumentation" part of SNMP operations. In one embodiment, when a GET command on an object is processed by the runtime agent, a form containing the item is pulled up from operating software, and the value of the data is read from the form. Similar processing is performed for a GETNEXT command. GETFIRST and GETNEXT functions are provided as static methods in the form. SET commands are also handled one varbind at a time. In one embodiment, a new empty form is created, set the varbind value into the form field, and push it down to the operating software. SNMP may be used for monitoring.

The IMGR 110 expects the operating software to provide a static pull and a static push function. In both cases, a reference to a form instance is passed as an argument. In one embodiment, when the form is for a table, another argument specifies the sequence number (not the instance) of the entry in the table (the table is assumed to remain constant during the lifespan of the operation).

In the case of pull operations, there is an additional flag argument indicating that the operating software should only fill out the fields of the form that have different values than the default startup values of the system. In the case of push operations, any fields of the form that are null can be disregarded—only the fields that are non-null need to be acted upon. The form provides public methods for setting and getting the fields of the form. In one embodiment, the same form can be used for push and pull operations.

In one embodiment, "native" methods are used where the C code of the platform accesses the methods and fields of the Java class. In the pull direction (from the system to the applications), the setter methods of the form object are used to fill out the form, while in the push direction, the fields of the form are accessed directly. Other approaches include use of "exec" functions called from within the form, or via the reading of 'proc' files.

In one embodiment, FAIL indications are returned if the pull operations do not succeed. In the case of push operations, even though there may be careful checking by SNMP and by CLI before pushing a form, there may be situations that a pushed form might not be acceptable by the operating software. A set of exceptions is provided for these situations.

FIG. 4 is a table illustrating exemplary XML (Extensible Markup Language) tags. The XML document can be viewed as a description document providing descriptions about how to interpret parameter data and statistic data. Each tag occurs in the XML document as a <tagname> . . . </tagname> combination. Attributes are enclosed in the tag fields with their values bounded by a pair of double quotation marks such as, for example, <tagname attribute="value">.

The <cli> tag 405 is the top-level element of the XML document. All other tags are subtags of this top-level <cli> tag 405. This <cli> tag 405 has no attributes and text inside the <cli> tag 405 is ignored. The <mode> tag 410 contains the mode of the management command. There should be only one <mode> tag 410 in the XML document. The <mode> tag 410 has a single attribute which identifies the name of the mode such as, for examples, <mode name='global'> or <mode name="exec">. The <command> tag 415 is the top-level tag for a single command. It has no attributes and text inside the <command> tag 415 is ignored. The <command> tag 415 contains a single <keyword> tag such as, for example,

```
<command >
        <keyword text="show">
        </keyword>
    </command>.
```

The <keyword> tag 420 specifies the text of a command keyword in the command set of the CLI such as, for example SHOW, ENABLE or LOGOUT. The text is supplied by the single attribute "text". The keywords may contain other <keyword> tags to specify sub keywords.

The <help> tag 425 specifies help information for the command/keyword. The <help> tag 425 has no attributes. The text enclosed by the <help> tag 425 defines the help text for the outlying tag, i.e. for a keyword or argument. One example of the help information follows:

```
<keyword text="show">
<help>Show running system information</help>
<keyword text="clock">
</keyword>
```

The <action> tag 430 specifies that there is a executable action for the enclosing keyword. For example, the action specified within the <action> tag 430 is carried out for the associated command when the carriage return is presses. The "object" and "method" attributes of the <action> tag 430 specify an object and a method in the system by name. A collection of Java type interfaces is created for the "objects" and "methods" that get invoked during run-time. One example of the object and the method follows:

```
<action object="CliSystem" method="clock">
</action>.
```

The <arg> tag 435 defines an argument type for an <action> tag 430. The <arg> tag 435 has no arguments and text in the <arg> tag 435 is ignored. A single <type> tag or <help> tag may be inserted in the body of the <arg> tag 435. One example of the <arg> tag 435 follows:

```
<arg>
    <type type="java.lang.String"></ type>
    <help>destination address or hostname</help>
</arg>
```

The <type> tag 440 describes a Java type for input to the invocation of the object, method pair specified by the <action> tag 430. The Java type name is entered as a "type" attribute of the <type> tag 440. Other text in the body of the <type> tag 440 other than those associated with the "type" attribute is ignored.

In this example, XML is used to describe the command language. XML is advantageous because there are a lot of available XML tools (e.g., editor tool, browser tool, etc.) for development. Although XML is used, one skilled in the art would recognize that other generalized markup languages (GML) may also be used to describe or map the management commands to the objects of the system, where the objects are low-level functions implemented in the system.

FIG. 5 is an exemplary illustration of a push operation and an XML document mapping the push operation. The XML document 525 describes statically all the keywords, arguments, and mapping from a CLOCK SET command to action in the system that will cause the action corresponding to the CLOCK SET command to be carried out. The CLOCK SET command is made available to a user or a management application interfacing with the system even though the system may not have the exact CLOCK SET command in its own command set. The XML document 525 describes the hierarchy of the CLOCK SET command keyword by keyword. Each command is associated with an action defined as an "object" and a "method".

The command 505 illustrates the "help" feature by specifying the "?" as part of the of command argument. This "help" feature is also illustrated in the command 510 and 515 to get additional information about the format (e.g., time, month, year) of the CLOCK SET command. The command 420 illustrates a complete CLOCK SET command with all the possible arguments or parameters specified. The XML document 525 describes the CLOCK SET command 505-520 using the XML tags described in FIG. 4. At run-time, the command CLOCK SET issued by the user or the management application is recognized by the interpreter as corresponding to the command keyword CLOCK shown on line 527 and the keyword SET shown on line 528. There may be multiple command keywords in the same XML document in addition to the CLOCK command. The interpreter will parse the XML document 525 to determine if the command is a valid command. In the current example, the help information requested in the commands 505-515 is enclosed in the <help> tags on lines 530, 535, 540 and 545 respectively.

Depending on the format of each of the CLOCK SET commands 505-520, a form containing information extracted from the arguments/parameters of the XML document 525 is pushed to the operating software at the lower-layer. The operating software then executes the action specified by the "object" and "method" attribute of the <action> tag shown on line 529. Results (i.e., statistical data) associated with this action is then pulled up from the lower layer and displayed to the user or presented to the management application in another form.

Figure 6:
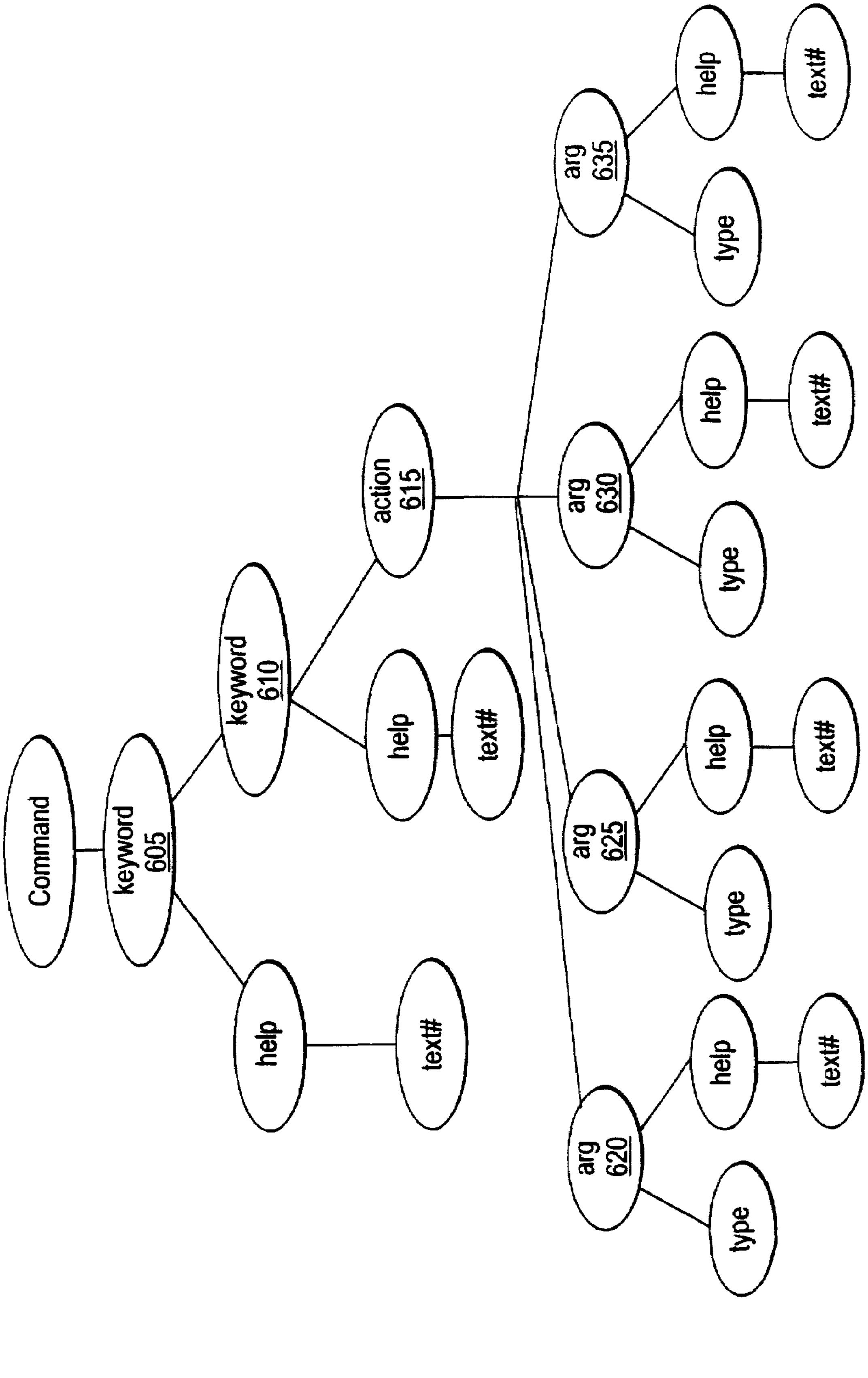
FIG. 6 is an exemplary illustration of a tree representation of an XML document describing a CLOCK SET command.

FIG. 6 is an exemplary illustration of a tree representation of an XML document describing a CLOCK SET command. An XML document created using the tags described in FIG. 4 is translated into a tree format that can be interpreted at run-time. The structure of the tree corresponds to the tags and attributes in the XML document. The tree also contains all of the texts enclosed by any of the tags so that every piece of information in the XML document is reflected in the resulting tree. Each tree describes what the command is and what the expected arguments/parameters are. In one embodiment, a Java Document Object Model (DOM) library is used to parse the XML document into a resulting tree or DOM tree. The DOM tree contains a collection of Java objects that represent the tags, attributes, and text of the corresponding XML document. The DOM tree in FIG. 6 corresponds to the CLOCK SET command described in the XML document 525 illustrated in FIG. 5. Note that there are only two keyword nodes 605, 610 corresponding to the keywords CLOCK and SET respectively. Note also that there are four argument nodes 620-635 under the action node 615. The four argument nodes 620-635 correspond to the arguments for "time", "day of month", "month" and "year" of the CLOCK SET command. The DOM tree and its collection of Java objects are translated into a collection of Java run-time classes.

FIG. 7 is an exemplary illustration of a pull operation and an XML document mapping the pull operation. The pull operations in this example include a SHOW CLOCK command 705 and a SHOW CLOCK DETAIL command 710. The XML document 715 illustrates a description of the above two commands 705 and 710 using XML keyword tags described in FIG. 4. The XML document 715 describes the SHOW CLOCK command using keywords, sub-keywords, help text, arguments, and specification of actions to be carried out by the lower-layer operating software.

The XML document 715 is presented in its source format and is normally compiled using an XML compiler so that it can be used by a run-time system. When a user or a management application issues the command, the run-time system performs object mapping, method mapping and the arguments/parameters are provided to the operating software of the system to carry out the action. For example, when the command SHOW CLOCK 705 is issued, the run-time system executes the action associated with an object CLOCK and a method SHOW, shown on line 720. When the command SHOW CLOCK DETAIL 710 is issued, the run-time system executes the action associated with an object CLOCK and a method SHOWDETAIL, as shown on line 725. The run-time system invokes a collection of Java system interfaces corresponding to the object and method specified in the action. The run-time system then collects data (parameter data) from the system, put them in a form and presents the form to the user or to the management application.

Using the method of the present invention, commands that are associated with the system and that are used to control the system can be shielded from the user. These commands can be described and expressed using a universal description language such as, for example, XML. A set of common commands is created by describing all of the commands associated with the system. For example, XML can be used to create a new set of commands that describe commands associated with a Lucent router such that the new set of command is consistent with commands associated with routers from Cisco. One skilled in the art would recognize that commands for other vendors can also be implemented. Using this method also shield the users from changes or version upgrades applied to the operating software of the system. In addition, when a new system is used, the commands can be made to be the same by describing and mapping the commands to the objects and methods of the new system. Thus, as shown in FIGS. 1A and 1B, by having the internal manager as the middle layer, the command set available in the upper layer through the CLI is independent of the system of the lower layer.

Figure 8:
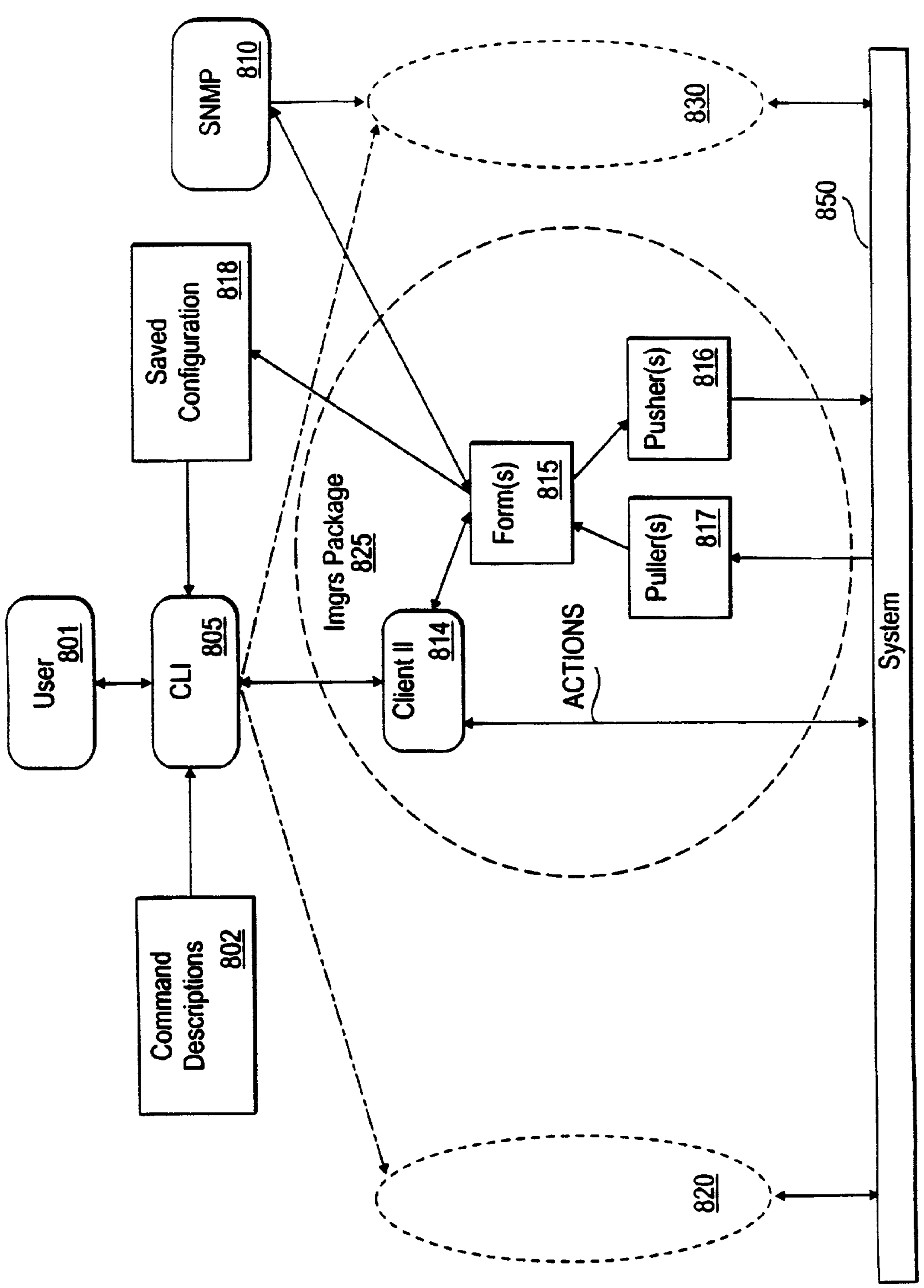
FIG. 8 is an exemplary illustration of interfaces between the internal manager, CLI and SNMP.

FIG. 8 is an exemplary illustration of interfaces between the internal manager, CLI and SNMP. The run-time versions of the commands described using the generalized markup language such as, for example, XML, may be stored in a command description file 802. When the user 801 enters a command, the CLI 805 searches the command description file 802 for the corresponding definition to carry out the command. The method of the present invention can also be used in a network environment using, for example, simple network management protocol (SNMP) and management information base (MIB). MIB modules specify targets of management operations. The MIB modules are interpreted to identify the target of management operations.

Instead of having the user or the management application issuing commands through the CLI, management commands may be issued using SNMP 810. SNMP 810 interfaces with the IMGR 110 to access information from the system 850. In one embodiment, the IMGR 110 is divided into several IMGR packages 820, 825, and 830. Each of the IMGR packages 820, 825 and 830 corresponds to a group of related services provided by the system 850. For example, the services may be grouped under IP routing, ATM routing, etc.

The IMGR package 825 transfers data between the system 850 and SNMP using forms 815, as described above. The IMGR package 825 includes a client interface 814, pullers 817 and pushers 816. When a command is issued by a user 801 though the CLI 805, the command is sent to the appropriate IMGR package 825. For example, when the command is a SET CLOCK command, the CLI 805 sends the command to the IMGR package 825 because it recognizes that the IMGR package 825 processes system related commands including the SET CLOCK command. The CLI 825 is able to make this recognition because, at an earlier time, the client interface 814 in the IMGR package 825 was registered with the CLI 805. This registration allows the client interface 814 to indicate to the CLI 805 that the client interface 814 handles system related commands. The client interface 814 is aware of the specific actions of the system 850.

The IMGR package 825 fills the form 815 with parameter data for push operations. The IMGR package 825 may also use the form 815 to extract parameter data and/or statistic data using pull operations. For example, when a GET operation is processed by the IMGR package 825, the form 815 containing the appropriate data is pulled up from the system 850. The data is then read from the form 815 by the SNMP 810.

Consider the following example of the results of an SNMP GET operation:

0.1.3.6.1.2.1.17.4.3.1.1.255.255.255.255.255.3=ff ff ff ff ff 03

This can be rewritten as:

{Dot1dTpFdbTable}.{Macaddress}.{255.255.255.255.255.3}=ff ff ff ff ff 03

And interpreted as:

The MAC address of the Fdb Table entry whose MAC address is 255.255.255.255.255.3 is ff:ff:ff:ff:ff:03

In this example, within the FdbEntry form, there is a field containing a MacAddress object. Access methods are provided to provide the value of the address in the two different schemas that SNMP requires: as a string ("255.255.255.255.255.3") as used for instancing an object, and as a 6-byte OCTET STRING used for the value. Internally, the MacAddress is kept as a 6-element integer array.

The GET operation described above can also be used to get a configuration of the system 850. A blank form 815 is pushed to the system by the pushers 816. Recognizing that the action is associated with a SAVE operation, the operating software of the system 850 fills out the blank form with configuration data. The filled-out form 815 is then pulled from the system 850 by the pullers 817. The configuration data may then be saved in a configuration file 818 for a subsequent restore operation. In one embodiment, the configuration file is saved in XML format. When a restore function is invoked, the configuration file 818 is processed into CLI command lines. The CLI command lines are fed back to the CLI 805.

Figure 9:
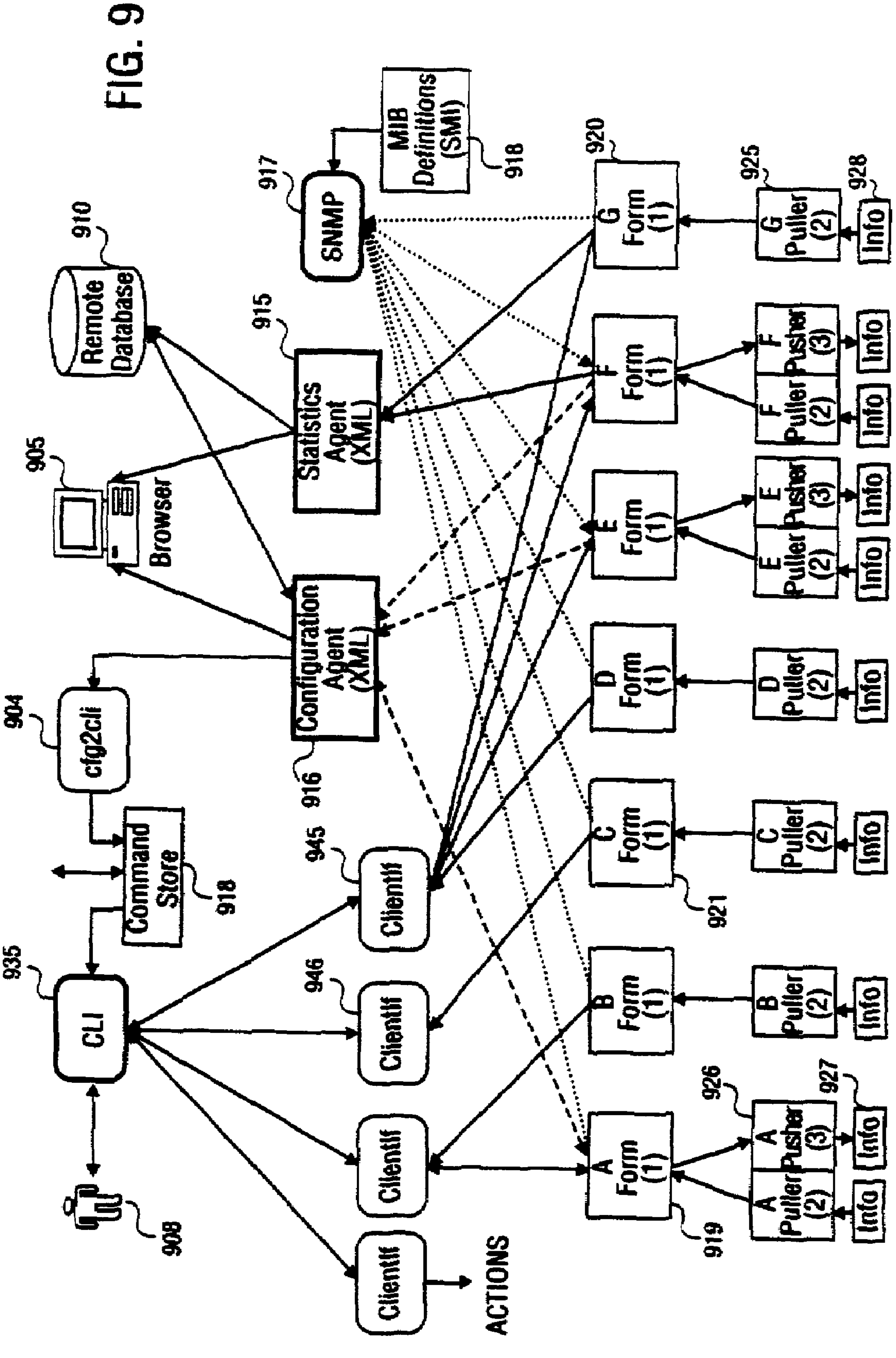
FIG. 9 is a block diagram illustrating one embodiment of a system implemented using forms to push and pull data, along with other applications that take advantage of the forms including configuration and statistic related applications.

FIG. 9 is a block diagram illustrating one embodiment of a system implemented using forms to push and pull data, along with other applications that take advantage of the forms including configuration and statistic related applications. As described above, the forms may be generated as a result of the user 908 issuing commands through the CLI 935. In this example, the CLI 935 then activates the client interface 945 which generate new forms or reuse stored forms depending on the commands and/or previous commands. There may be different types of forms. For example, one type of form may be used to carry multiple data entries in a table format such as data available in multiple ports, and another type of form may be used to carry a single data entity such as data available from a console.

Each client interface ("ClientIf") may be associated with a different function. For example, the client interface 945 may be responsible for pushing and/or pulling data carried by the forms "D", "E", "F", and "G". Other client interfaces may have different responsibilities using different forms (e.g., "A", "B", and "C"). When a form is used to pull data from the system, a directional arrow connects from the form to the client interface. For example, the client interface 946 uses form 921 ("C") to pull data from the system. When a form is used to push data to the system, a directional arrow connects from the client interface to the form. When a form can be used both to push and to pull data, a bi-directional arrow is used.

The forms "A" to "G" in this example may also be used to store and/or to restore configuration data, and to collect statistic data from the system using SNMP 917 and MIBs 918, as described in FIG. 8. In one embodiment, a configuration agent 916 is used with the forms (e.g., form "A" 919) to restore configuration information 927 to the system using pusher 926. The configuration agent 916 may display the configuration data using the browser 905, store the configuration data in the database 910, display the configuration data to the user 908 using the CLI 935 (after converting the configuration data into a format understandable by the CLI 935 using a converter such as, for example, the cfg2cli 904, or store the converted configuration data in a command store 918 for batch execution, etc. In another embodiment, a statistic agent 915 is used with the forms (e.g., form "G" 920) to collect or pull statistic information 928 from the system using puller 925. Note that since the statistic agent 915 collects information from the system, the connections from the forms to the statistic agent 915 are illustrated as one directional originating from the forms.

Figure 10:
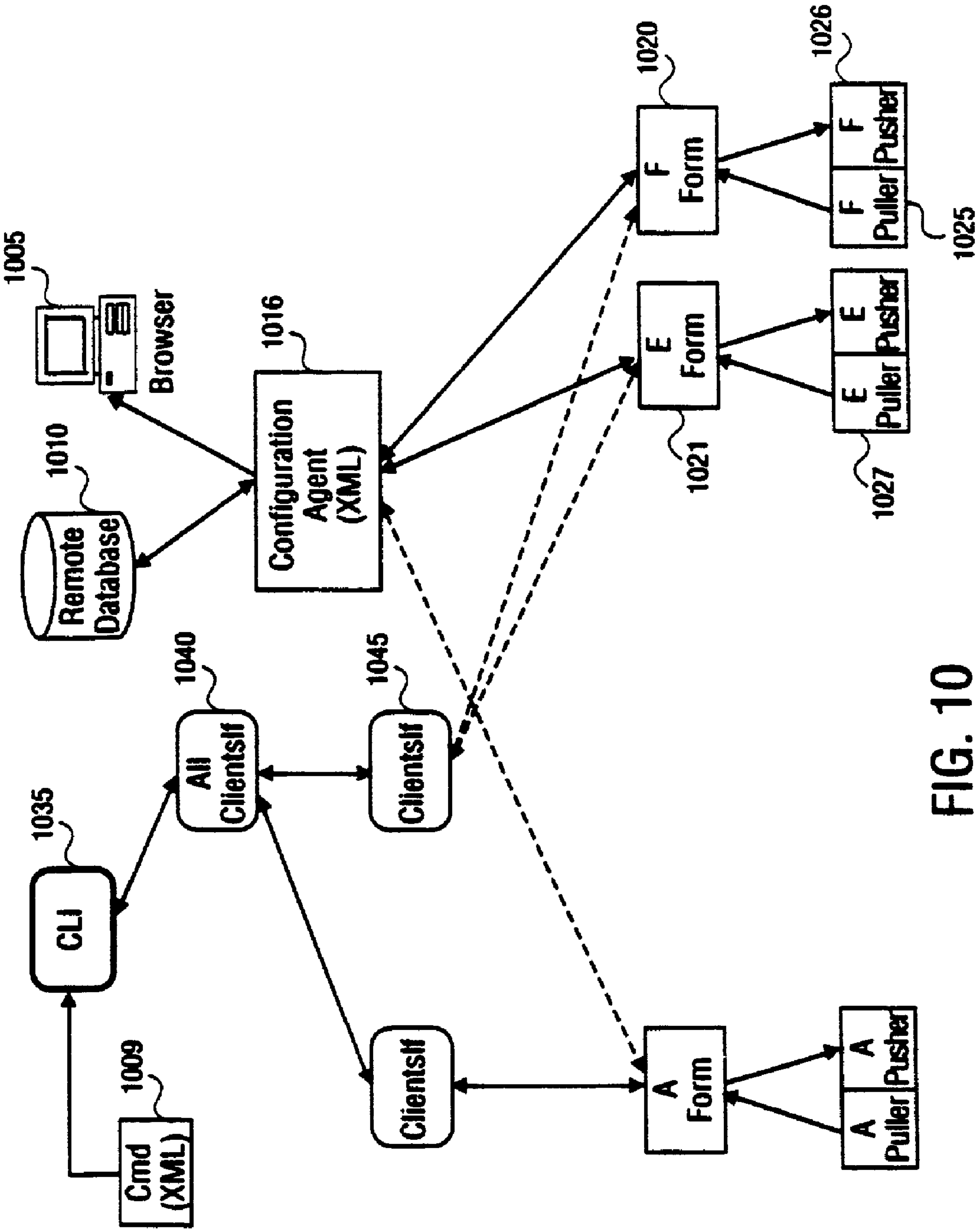
FIG. 10 is a block diagram illustrating one embodiment of configuration store and restore using forms and Extensible Markup Language (XML).

FIG. 10 is a block diagram illustrating one embodiment of a configuration store and restore application using forms and Extensible Markup Language (XML). From its initial operation, a system may receive multiple configuration information for its components from the user. Over time, some components may retain the same configuration information, while some other components may have been changed multiple times. Thus, the configuration information from the system may be viewed as a collection of configuration objects that represent a snap shot of a desired operation state of the system, even though each configuration object may have been specified at different times. From the users point-of-view, this collection of configuration objects is valuable because it may represent much time and effort spent in fine-tuning the system.

Referring to FIG. 10, a user may specify a configuration object by issuing commands using the CLI 1035. More than one configuration objects may be specified by the user using a batch file. Of course, the sequence of commands in the batch file needs to be consistent with one another. The CLI then activates the AllClientIf 1040. Depending on the commands the AllClientIf 1040 activates the appropriate ClientIf 1045. One or more forms are generated to push configuration data to the system (e.g., changing an IP address for the system) or to pull configuration data from the system when a configuration object is to be viewed. The pulled configuration data may also be stored for later use (e.g., configuration restore) in the remote database 1010. For example, the form "F" 1020 may be used by the ClientIf 1045 to push a configuration object to the system using the pusher 1026. The form "E" 1021 may be used by the ClientIf 1045 to pull a configuration object from the system using the puller 1027.

A configuration agent 1016 may also be used to push configuration objects to the system and/or to pull configuration objects from the system. For example, a user using browser at a remote workstation 1005 may send requests to the configuration agent 1016 to view one or more configuration objects. As in the case of using the CLI 1035, the configuration agent 1016 generates one or more forms to push configuration data to the system when a configuration object is to be changed (or reconfigured), or to pull configuration data from the system when a configuration object is to be viewed. For example, configuration agent 1016 generates the form "F" 1020 to push a configuration object to the system using the pusher 1026, and the configuration agent 1016 generates the form "E" 1021 to pull a configuration object from the system using the puller 1027.

When pulling configuration objects from the system, the configuration agent 1016 also converts the configuration data into the XML format before presenting the configuration data to the user at the workstation 1005. The XML formatted configuration data may also be stored by the configuration agent 1016 in the remote database 1010 for later use. When pushing configuration objects to the system using the stored XML formatted configuration data in the remote database 1010, the configuration agent 1016 may convert the XML formatted configuration data back into a form understandable by the system.

It may be noted that one or more configuration objects may be pushed or pulled on the same form. For example, using the browser at the workstation 1005, the user may issue a request to save the configuration of the system. In this case, the configuration agent 1016 generates forms to pull all of the configuration objects from the system. The configuration data associated with the configuration objects are then converted into the XML format and stored in the remote database 1010. The configuration data may also be stored in a configuration file in a storage device (not shown). In one embodiment, when a configuration object has not been changed since the system was manufactured (e.g., same default value), the corresponding field in the form is not filled out.

Figure 11:
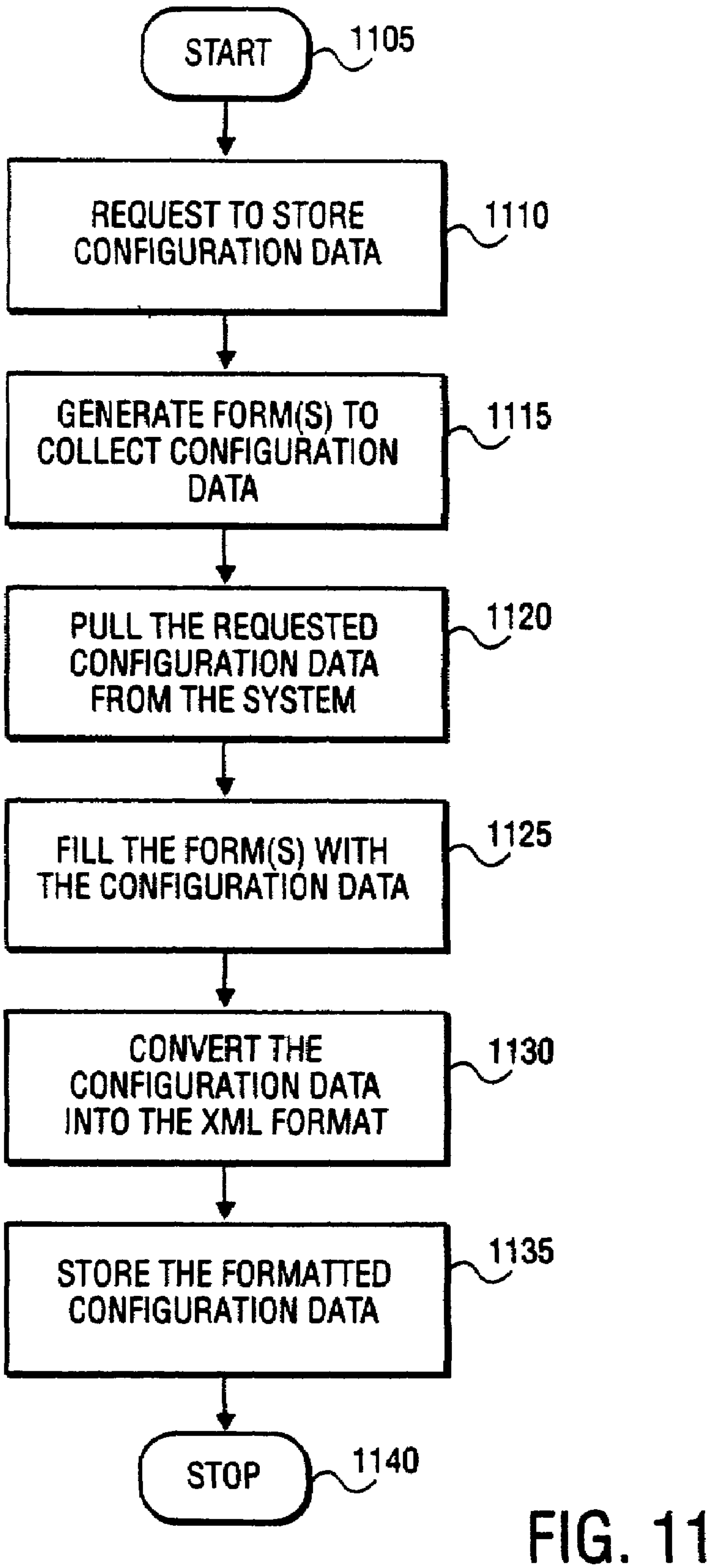
FIG. 11 is a flow diagram illustrating an example of a configuration store process in accordance with one embodiment of the present invention.

FIG. 11 is a flow diagram illustrating an example of a configuration store process in accordance with one embodiment of the present invention. The process starts at block 1105. At block 1110, a request to store configuration data is issued. At block 1115, one or more forms are generated to collect the configuration data. These forms may be generated by the configuration agent, as described above. At block 1120, configuration data associated with the requested configuration file is pulled from the system. At block 1125, the configuration data is used to fill the form. At block 1130, the configuration data in the form is converted into the XML format. At block 1135, the formatted configuration data is store. The process stops at block 1140.

Figure 12:
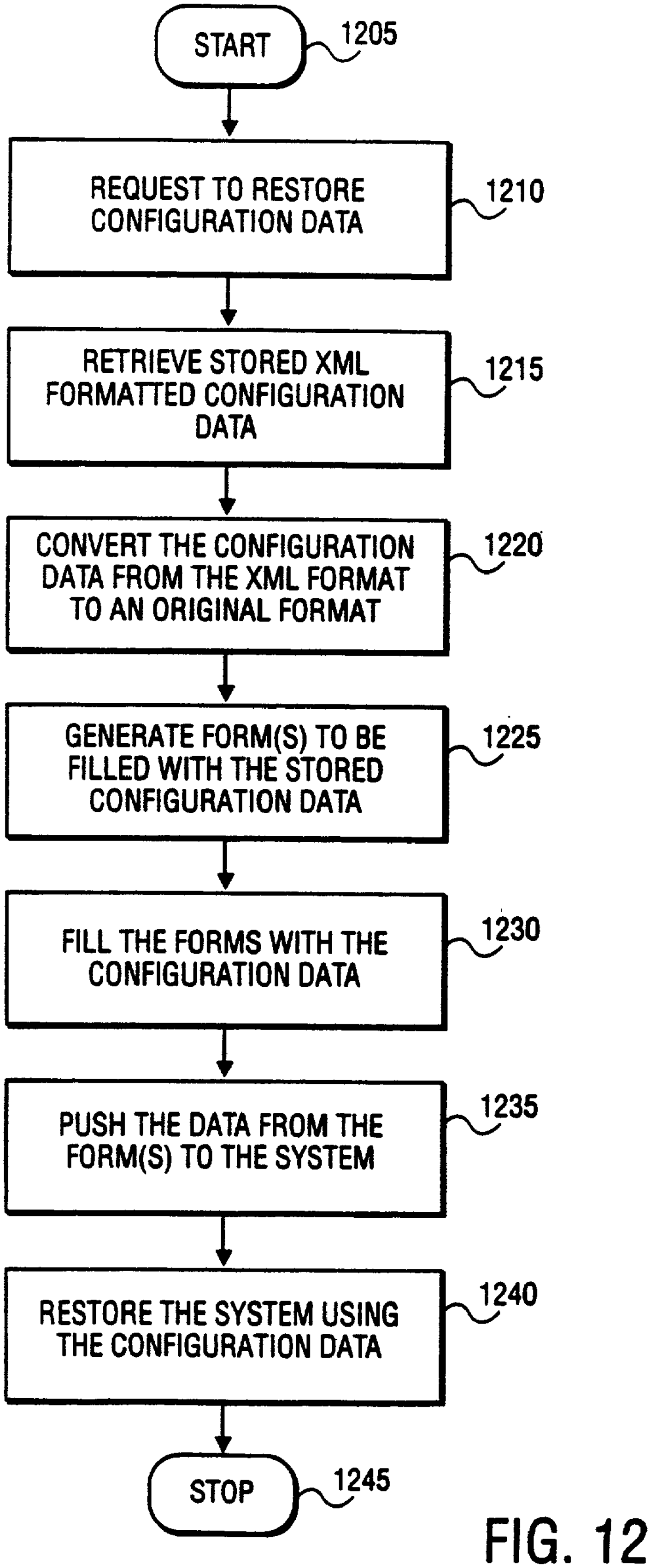
FIG. 12 is a flow diagram illustrating an example of a configuration restore process in accordance with one embodiment of the present invention.

FIG. 12 is a flow diagram illustrating an example of a configuration restore process in accordance with one embodiment of the present invention. The process starts at block 1205. At block 1210, a request to restore configuration data is issued. At block 1215, the configuration data is retrieved from a storage location (e.g., the remote database 1010 in FIG. 10). The configuration data is then converted from the XML format to a format understandable by the system, as shown in block 1220. At block 1225, one or more forms are generated to push the configuration data. These forms may be generated by the configuration agent, as described above. At block 1230, the forms are filled out with the configuration data. At block 1235, the forms with the configuration data are pushed to the system. At block 1240, the configuration data is used to restore the system to a desired state. The process stops at block 1245.

Figure 13:
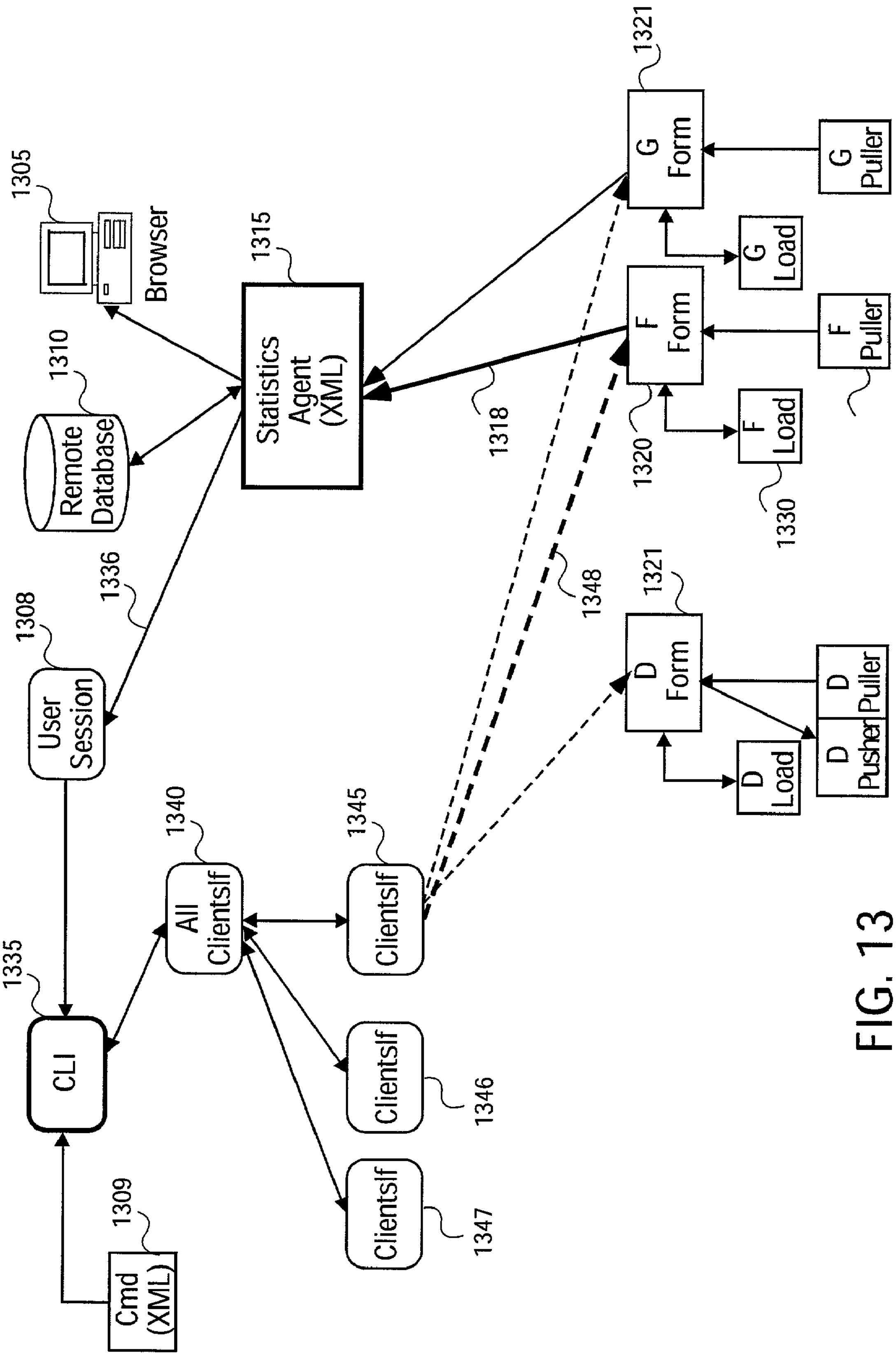
FIG. 13 is a block diagram illustrating one embodiment of statistic collection using forms and XML.

FIG. 13 is a block diagram illustrating one embodiment of statistic collection application using forms and XML. As described in FIG. 8, one technique of collecting statistic information is to use SNMP because SNMP has a mechanism for requesting specific statistic information or counter. For example, an SNMP agent gets the statistic information and sends it to an SNMP client. The SNMP client may have a monitor associated with it to view the statistic information. The SNMP agent may be customized software or off-the-shelves software such as, for example, OpenView from the Hewlett Packard Corporation of Cupertino, Calif., to perform this type of operation.

Another technique of collecting statistic information is to use the statistic agent 1315. Using this technique, a user located at a remote location may be able to collect and review the statistic information of the system using a browser at station 1305. The statistic agent 1315 provides the user knowledge of the statistic information available in the system. For example, using the Internet, the user may sign on to the statistic agent 1315 using the Internet Protocol (IP) address of the statistic agent 1315. This IP address may have been published to the user previously. Other IP addresses of the system may also be published. Through its homepage, the statistic agent 1315 presents to the user the available statistic information in the system.

Using the browser, the user may send a request to the statistic agent 1315 to view selected statistic information. The user may then view the selected statistic information on the browser. This selection capability avoids having the user be flooded with all of the statistic data available in the system. Based on the user's request, the statistic agent 1315 then determines what forms to use or to generate. From the user point-of-view, the statistic agent 1315 makes available the statistic information of the system. The user may not have any knowledge how the statistic information is collected from the system, and how it is formatted. The user may request for absolute statistic information or incremental statistic information. Absolute statistic information refers to statistic information as kept track by the system from when that statistic information was first kept track of. Incremental statistic information refers to change in the statistic information from a last time the statistic information was collected.

The statistic agent 1315 has knowledge of what forms to generate to collect the requested statistic information. The statistic information is collected from the system using one or more forms designed for carrying statistic (e.g., form "F" 1320 and form "G" 1321). The statistic agent 1315 may generate a new form 1320 (form "F") and send it out to have the statistic information filled in. Alternatively, the statistic agent 1315 may keep a form and get it refreshed with the new statistic information collected based on the user's request. In this situation, the statistic agent 1315 stores the last collected statistic information 1330 and uses it to compare with the new collected statistic information to determine incremental change. This way, the statistic agent 1315 does not have to create a new form each time a request for the same statistic information is received from the user.

The ability to provide incremental data relieves the user from having to calculate differences from the last collection of the same statistic information. In this case, the statistic agent 1315 only returns the difference to the user. The statistic information is returned to the user in the XML format. This allows the statistic information to be displayed and presented to the user through the browser. Placing the statistic information into the XML format also allows the statistic information to be used by other devices capable of processing data in the XML format. Referring to FIG. 13, note that there is no connection between the statistic agent 1315 and the form 1321 (form "D"). This means the form 1321 is not used to carry any statistic, but rather it is used to carry parameter, as described above. The statistic agent 1315 may send the statistic information in the XML format or it may send the statistic information in HTML document by attaching HTML headers to the document.

The user may locally establish a user session 1308 with the system and issue commands to collect statistic information using the command line interface (CLI) 1335. The CLI then forward and have the commands processed by the AllClientIf ("All Client Interface") 1340 which may in turn activate the appropriate ClientIf ("Client Interface") 1345. Note that each of the ClientIf 1345, 1346, and 1347 may be associated with different types of forms or forms that carry different data of the same types (statistic or parameter). Similar to the statistic agent 1315, the ClientIf 1345 may generate new form(s) 1320 to collect statistic information using puller 1325 or it may use a stored form to be able to determine between the last statistic information 1330 and the new statistic information. The forms are then filled with the requested statistic information from the system. The statistic agent 1315 then generates an XML response to the user using connection 1336. In one embodiment, the statistic agent 1315 may store the collected statistic information in a database 1310. One of the advantages of the statistic collection technique described here using XML is that a user may be able to access and view the statistic data with a browser which is available at low cost, as compared to having to purchase an expensive SNMP software such as, for example, Openview.

Figure 14:
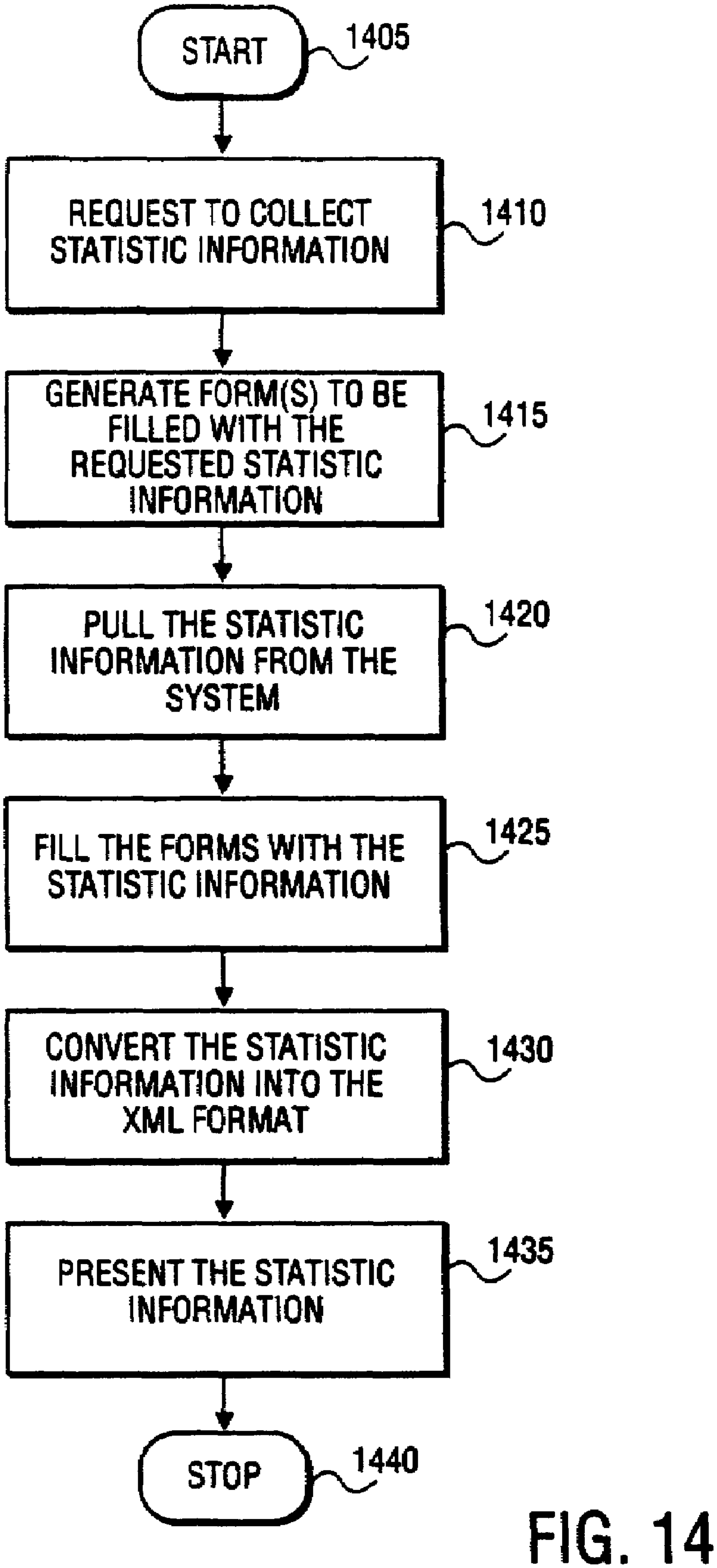
FIG. 14 is a flow diagram illustrating an example of a statistic collection process in accordance with one embodiment of the present invention.

FIG. 14 is a flow diagram illustrating an example of a statistic collection process in accordance with one embodiment of the present invention. The process starts at block 1405. At block 1410, a request for statistic information is initiated. For example, a user may initiate this request using a browser or using the CLI, as described above. At block 1415, one or more forms are generated so that the requested statistic information may be filled in. When these are new forms, the fields to hold the statistic information may be blank. At block 1420, data associated with the requested statistic information is pulled from the system. At block 1425, the pulled data is used to fill the fields in the forms. At block 1430, the data associated with the requested statistic information is formatted into the XML format. At block 1435, the XML formatted statistic information is presented to the user. The process stops at block 1440. Note that the statistic information presented to the user may be in an incremental form or in an absolute form, as described above. Although the above examples are illustrated using XML, other generalized markup language (GML) format may also be used.

The operations of the various methods of the present invention may be implemented by a processing unit in a digital processing system, which executes sequences of computer program instructions which are stored in a memory which may be considered to be a machine-readable storage media. The memory in the digital processing system may be random access memory, read only memory, a persistent storage memory, such as mass storage device or any combination of these devices. Execution of the sequences of instruction causes the processing unit to perform operations according to the present invention. The instructions may be loaded into memory of the computer from a storage device or from one or more other digital processing systems (e.g. a server computer system) over a network connection. The instructions may be stored concurrently in several storage devices (e.g. DRAM and a hard disk, such as virtual memory). Consequently, the execution of these instructions may be performed directly by the processing unit.

In other cases, the instructions may not be performed directly or they may not be directly executable by the processing unit. Under these circumstances, the executions may be executed by causing the processor to execute an interpreter that interprets the instructions, or by causing the processor to execute instructions which convert the received instructions to instructions which can be directly executed by the processor. In other embodiments, hard-wired circuitry may be used in place of or in combination with software instructions to implement the present invention. Thus, the present invention is not limited to any specific combination of hardware circuitry and software, nor to any particular source for the instructions executed by the computer or digital processing system.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method, comprising:

receiving a request from a system management application to retrieve performance or error monitoring information relating to an operational state of a networked routing system managed via the system management application;

generating one or more forms to carry the requested monitoring information from the system;

based on the generated one or more forms and responsive to the request to retrieve the monitoring information, pulling the requested monitoring information from the system, wherein the monitoring information cannot be pushed to the system;

filling the one or more forms with the pulled requested monitoring information, wherein each of the forms comprises one or more data fields and filling the one or more forms with the pulled requested monitoring information comprises determining if the pulled requested monitoring information for a data field is different from its default setting value, and if the pulled requested monitoring information for the data field is the same as the default setting value, leaving the data field blank; and converting the monitoring information on the one or more forms to a generalized markup language (GML) format.

2. The method of claim 1, wherein the generalized markup language is extensible markup language (XML).

3. The method of claim 2, further comprising displaying formatted monitoring information in a browser.

4. The method of claim 1, further comprising storing formatted monitoring information.

5. The method of claim 1, further comprising presenting the monitoring information using a command line interface (CLI).

6. The method of claim 1, wherein receiving the request to retrieve monitoring information of the system comprises receiving a request to retrieve incremental monitoring information and wherein filling the one or more forms with the pulled requested monitoring information comprises filling the one or more forms with the incremental monitoring information.

7. The method of claim 1, wherein the request identifies selected monitoring information to be retrieved from the system.

8. The method of claim 1, wherein the request is issued from an Internet browser to an Internet Protocol (IP) address associated with the system.

9. A computer readable medium having stored thereon sequences of instructions which are executable by a digital processing system, and which, when executed by the digital processing system, cause the system to perform a method comprising:

receiving a request from a system management application to retrieve performance or error monitoring information relating to an operational state of a networked routing system managed via the system management application;

generating one or more forms to carry the requested monitoring information from the system;

based on the generated one or more forms and responsive to the request to retrieve the monitoring information, pulling the requested monitoring information from the system, wherein the monitoring information cannot be pushed to the system;

filling the one or more forms with the pulled requested monitoring information, wherein each of the forms comprises one or more data fields and filling the one or more forms with the pulled requested monitoring information comprises determining if the pulled requested monitoring information for a data field is different from its default setting value, and if the pulled requested monitoring information for the data field is the same as the default setting value, leaving the data field blank; and converting the monitoring information on the one or more forms to a generalized markup language (GML) format.

10. The computer readable medium of claim 9, wherein the generalized markup language is extensible markup language (XML).

11. The computer readable medium of claim 10, further comprising displaying formatted monitoring information in a browser.

12. The computer readable medium of claim 9, further comprising storing formatted monitoring information.

13. The computer readable medium of claim 9, further comprising presenting the monitoring information using a command line interface (CLI).

14. The computer readable medium of claim 9, wherein receiving the request to retrieve monitoring information of the system comprises receiving a request to retrieve incremental monitoring information and wherein filling the one or more forms with the pulled requested monitoring information comprises filling the one or more forms with the incremental monitoring information.

15. The computer readable medium of claim 9, wherein the request identifies selected monitoring information to be retrieved from the system.

16. The computer readable medium of claim 9, wherein the request is issued from an Internet browser to an Internet Protocol (IP) address associated with the system.

17. A method, comprising:

pulling, in response to a request from a system monitoring application, performance or error monitoring information relating to an operational state of a digital routing system from the digital routing system based upon fields included in one or more forms, the one or more forms designed to carry the monitoring information, wherein the monitoring information cannot be pushed to the system;

filling the one or more forms with the pulled monitoring information, wherein each of the forms comprises one or more data fields and filling the one or more forms with the pulled requested monitoring information comprises determining if the pulled requested monitoring information for a data field is different from its default setting value, and if the pulled requested monitoring information for the data field is the same as the default setting value, leaving the data field blank; and converting the monitoring information on the one or more forms to a generalized markup language (GML) format, wherein receiving the request to retrieve monitoring information of the system comprises receiving a request to retrieve incremental monitoring information.

18. The method of claim 17, further comprising:

generating one or more forms to carry the monitoring information.

19. The method of claim 17, wherein pulling monitoring information comprises pulling incremental monitoring information and wherein filling the one or more forms with the pulled requested monitoring information comprises filling the one or more forms with the incremental monitoring information.

20. The method of claim 17, wherein the generalized markup language is extensible markup language (XML).

21. The method of claim 20, further comprising displaying formatted monitoring information in a browser.

22. The method of claim 17, further comprising storing formatted monitoring information.

23. The method of claim 17, further comprising presenting the pulled monitoring information using a command line interface (CLI).

24. A computer readable medium having stored thereon sequences of instructions which are executable by a digital processing system, and which, when executed by the digital processing system, cause the system to perform a method comprising:

pulling, in response to a request from a system monitoring application, performance or error monitoring information relating to an operational state of a digital routing system from the digital routing system based upon fields included in one or more forms, the one or more forms designed to carry the monitoring information, wherein the monitoring information cannot be pushed to the system;

filling the one or more forms with the pulled monitoring information, wherein each of the forms comprises one or more data fields and filling the one or more forms with the pulled requested monitoring information comprises determining if the pulled requested monitoring information for a data field is different from its default setting value, and if the pulled requested monitoring information for the data field is the same as the default setting value, leaving the data field blank; and converting the monitoring information on the one or more forms to a generalized markup language (GML) format, wherein receiving the request to retrieve monitoring information of the system comprises receiving a request to retrieve incremental monitoring information.

25. The computer readable medium of claim 24, further comprising:

receiving a request to retrieve the monitoring information; and generating one or more forms to carry the monitoring information.

26. The computer readable medium of claim 24, wherein pulling monitoring information comprises pulling incremental monitoring information and wherein filling the one or more forms with the pulled requested monitoring information comprises filling the one or more forms with the incremental monitoring information.

27. The computer readable medium of claim 24, wherein the generalized markup language is extensible markup language (XML).

28. The computer readable medium of claim 27, further comprising displaying formatted monitoring information in a browser.

29. The computer readable medium of claim 24, further comprising storing formatted monitoring information.

30. The computer readable medium of claim 24, further comprising presenting the pulled monitoring information using a command line interface (CLI).

* * * * *